United States Patent [19]

Abthoff et al.

[11] 4,235,846
[45] Nov. 25, 1980

[54] CONVERTER FOR EXHAUST GAS WITH REMOVABLE INSERT HOUSINGS HAVING MONOLITHIC CATALYST THEREIN

[75] Inventors: Jörg Abthoff, Plüderhausen; Hans-Dieter Schuster, Schornbach; Hans-Joachim Langer, Fellbach-Schmiden, all of Fed. Rep. of Germany

[73] Assignee: Daimler-Benz Aktiengesellschaft, Fed. Rep. of Germany

[21] Appl. No.: 14,854

[22] Filed: Feb. 23, 1979

Related U.S. Application Data

[63] Continuation of Ser. No. 610,423, Sep. 4, 1975, abandoned.

[30] Foreign Application Priority Data

Sep. 5, 1974 [DE] Fed. Rep. of Germany ....... 2442488

[51] Int. Cl.³ ............................ F01N 3/28; F01N 7/08; F01N 7/14; F01N 7/18
[52] U.S. Cl. .................................. 422/171; 422/179; 422/180; 422/219; 60/299
[58] Field of Search ................... 60/299, 322; 422/171, 422/179, 180, 219

[56] References Cited

U.S. PATENT DOCUMENTS

| | | | |
|---|---|---|---|
| 2,664,340 | 12/1953 | Houdry | 422/177 |
| 3,441,382 | 4/1969 | Keith et al. | 422/180 |
| 3,768,982 | 10/1973 | Kitzner et al. | 422/180 |
| 3,798,006 | 3/1974 | Balluff | 422/180 |
| 3,854,888 | 12/1974 | Frietzsche et al. | 422/171 |
| 3,892,536 | 7/1975 | Roeser et al. | 422/179 |
| 3,905,775 | 9/1975 | Sowards et al. | 422/180 |
| 4,145,394 | 3/1979 | Abthoff et al. | 422/180 |
| 4,163,042 | 7/1979 | Lynch | 422/179 |

FOREIGN PATENT DOCUMENTS

2248442 4/1974 Fed. Rep. of Germany .

Primary Examiner—Bradley R. Garris
Attorney, Agent, or Firm—Craig & Antonelli

[57] ABSTRACT

In an installation for the catalytic decontamination of exhaust gases of internal combustion engines, especially of motor vehicle internal combustion engines, in which a preferably cylindrical catalyst-monolith is supported in a corresponding housing under interposition of radially elastic elements, the housing is thereby detachably connected at least at one open side with an adjoining pipe or structural part and each monolith is inserted from that side into the housing by means of a separate insert housing and is then axially fixed by the detachable pipe or structural part.

26 Claims, 1 Drawing Figure

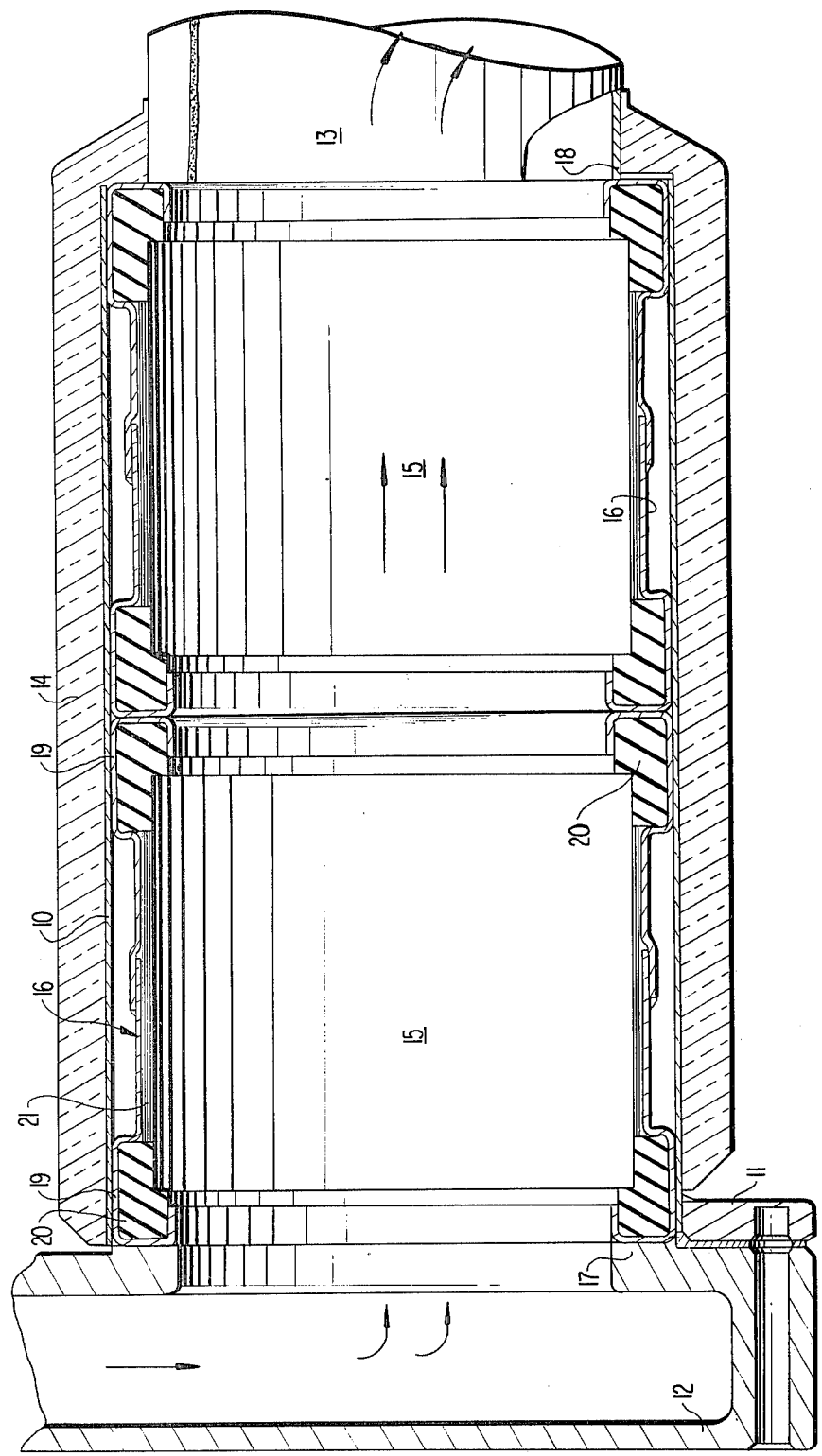

CONVERTER FOR EXHAUST GAS WITH REMOVABLE INSERT HOUSINGS HAVING MONOLITHIC CATALYST THEREIN

This is a continuation of application Ser. No. 610,423, filed Sept. 4, 1975 and now abandoned.

The present invention relates to an installation for the catalytic purification or decontamination of the exhaust gases of internal combustion engines, especially of motor vehicle internal combustion engines, in which at least one preferably cylindrical catalyst-monolith is supported in a corresponding housing by the interposition of radially elastic elements.

The German Auslegeschriften Nos. 1,476,505 and 1,476,507 are examples for the types of installations described hereinabove. Elastic or at least yielding supports are chosen in the aforementioned German Auslegeschriften because with the catalyst-monoliths in question, there always exists the difficulties of arranging the same in a thermally insulated manner, on the one hand, and protecting the same against vibrations, on the other, since the latter may lead to the destruction of the monoliths. These difficulties are further enhanced by the fact that in recent times ever-greater demands are made as regards the overall running period of the exhaust gas purification system so that the interchange of the individual monoliths is required.

The present invention is concerned with the task to provide a solution to this problem. In other words, an installation is to be proposed by the present invention, which is so constructed and arranged that by means of the same an easy interchange of the respective monoliths is possible and in which as many parts of the overall installation as possible remain preserved. The underlying problems are solved according to the present invention in the installations of the aforementioned type in that the housing is detachably connected at least at one open side with the adjoining pipe elbow or the like and in that each monolith is inserted into the housing from this side by means of a separate insert housing and is axially fixed by the elbow or the corresponding structural part. A solution is thereby preferred in which the essentially drum-shaped insert housing surrounds the monolith collar-shaped at both outer edges and axially and radially springy or elastic annular elements are arranged in these collar portions for the support of the monoliths.

A housing which is uniform for several monoliths, is created by the present invention which remains preserved including the thermal insulation thereof. The exchange of the monoliths on the inside of this housing is very readily possible, and the monoliths themselves including their elastic or at least yielding support are constructed as expendable parts, so to speak of. This entails the further advantage of a lower load on and stress in the monoliths by mechanical vibrations since the forces are for the most part removed as a consequence of the unitary housing, and the vibration dampening achieved by the reduced force-locking connection.

A further feature of the present invention resides in that the insert housing is radially drawn-in between the rectilinear parts and a radially springy or elastic layer is arranged in this area between the insert housing and the monolith. According to the present invention, the insert housing may consist of two essentially identical halves which are joined at an annular seam located intermediate the collar portions.

It is also proposed according to the present invention for the construction and configuration of a unitary outer housing that the tubularly shaped housing is provided on one side with an outwardly facing flange and is connected on the other side with a pipe or a corresponding structural part, whose end face serves simultaneously as abutment for the slide-in insert housings. The unitary outer housing may be provided also in the present invention with an insulating layer of conventional type. Additionally, it is also within the purview of the present invention if the collar portions and the spring elements arranged therein are not ring-shaped but are constructed as segments which are uniformly distributed over the circumference.

Accordingly, it is an object of the present invention to provide an installation for the catalytic decontamination of the exhaust gases of internal combustion engines which avoids by simple means the aforementioned shortcomings and drawbacks encountered in the prior art.

Another object of the present invention resides in an installation for the catalytic decontamination of the exhaust gases of internal combustion engines which permits a ready exchange of the corresponding monoliths, yet preserves as many parts of the overall installation as possible.

A further object of the present invention resides in an installation for the catalytic decontamination of the exhaust gases of internal combustion engines, in which the catalytic monoliths are arranged in a heat-insulated manner, yet are extensively protected against vibrations to prevent the premature destruction thereof.

Still a further object of the present invention resides in a catalytic decontamination system for internal combustion engines which includes a unitary housing for several monoliths that can be used over and over again even though the monoliths themselves have to be exchanged.

Another object of the present invention resides in a catalytic converter of the type described above in which the catalytic monoliths are extensively protected against mechanical vibrations to minimize the danger of damage thereto.

These and other objects, features and advantages of the present invention will become more apparent from the following description when taken in connection with the accompanying drawing which shows, for purposes of illustration only, one embodiment in accordance with the present invention, and wherein:

The single FIGURE is a longitudinal cross-sectional view through a catalyst support in accordance with the present invention.

Referring now to the single FIGURE of the drawing, the outer surrounding housing is formed by a tubular member 10, at the one open end of which is rigidly secured externally a flange 11. This flange 11 serves for the fastening of a pipe elbow 12, or the like, through which the exhaust gases flow in to the inlet side of the catalytic converter. This flange connection is constructed according to the present invention so as to be detachable. At the other end, the pipe 10 is rigidly connected with an exhaust gas pipe 13 further conducting the exhaust gases toward the atmosphere in the usual manner. This exhaust gas pipe 13 has a smaller diameter than the housing pipe 10. The latter as well as the transition to the exhaust gas pipe 13 are provided with an insulating layer 14 of conventional material.

Two monoliths 15 are interchangeably inserted into this tubularly shaped outer housing 10 with the aid of separate insert housings generally designed by reference numeral 16. The axial fixing of the two insert housings 16 takes place by the end face 17 of the detachably fastened pipe elbow or knee 12, whereas on the other side the last insert housing 16 abuts against the end face 18 of the exhaust gas pipe 13. Each insert housing 16 surrounds the monolith 15 at both outer edges by means of collar portions 19 which extend ring-shaped. Springy or elastic ring elements 20 are arranged in these collar portions 19 which provide for the monoliths 15 a certain elastic support both in the radial as also in the axial direction. Each insert housing 16 is radially drawn-in, i.e., reduced in diameter, between its two collar portions 19 and an elastic intermediate layer 21 is provided in this area between the same and the monolith 15. This intermediate layer 21 may consist of any suitable known material such as of a radially springy wire-mesh or of a type of undulated tubular member. Each insert housing 16 consists of two essentially similar parts which during the assembly are slipped over the monolith 15 from both end faces and are then connected with each other in the center by an annular seam or the like.

For purposes of exchanging one or several monoliths, the flange connection 11, 12 is disconnected so that then the monoliths 15 including their insert housings 16 can be pulled out of the outer housing 10. After the insertion of new insert housings including new monoliths, the flanged connection is again screwed tight and the exhaust gas purification installation is again ready for use. It should also be mentioned in that connection that, of course, any suitable number of the illustrated and described insert housings including monoliths may be provided in a given unitary outer housing.

In the illustrated embodiment, the detachable connection of the housing 10 is located on the inflow side of the catalyst. However, within the scope of the present invention, this separation may also be displaced from the catalyst inlet to the catalyst outlet so that the housing can be manufactured together with the exhaust elbow as a single piece-for example, as a unitary casting. The flange connection would then be analogously located at the exhaust gas pipe 13 whereas the pipe elbow 12 forms a unitary single-piece structure together with the housing 10.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for the catalytic decontamination of exhaust gases of internal combustion engines comprising an outer housing means, at least one insert housing means disposed therein, said insert housing means including a catalyst-monolith means supported therein by the interposition of radially elastic means, said outer housing means being detachably connected at least at one open side with an adjoining structural part and said insert housing means being insertable into said outer housing means from said side, said insert housing means being axially confined by said adjoining structural part, said installation being characterized in that said part is a tubular member of an exhaust system and in that the insert housing means is an essentially drum-shaped assembly, said assembly comprising two outer collar portions and a wall portion extending therebetween and said assembly fixedly engaging and surrounding the catalyst-monolith means at the periphery of both outer ends thereof, and in that said elastic means comprises axially and radially elastic annular elements arranged in said collar portions for the support of the catalyst-monolith means, and wherein the wall portion of said insert housing means is radially drawn-in between th collar portions and in that said elastic means includes a radially elastic layer disposed between said wall portion and said catalyst-monolith means.

2. An installation according to claim 1, characterized in that the insert housing means consists of two essentially similar halves which are joined at an annular seam located between the two collar portions.

3. An installation according to claim 2, characterized in that said outer housing means is tubularly shaped and includes on one side an externally disposed flange and includes on the other side an indent member serving as a support abutment for the insertable insert housing means.

4. An installation according to claim 3, characterized in that the outer housing means is provided with an insulating layer.

5. An installation according to claim 4, characterized in that said tubular member is a pipe elbow.

6. An installation according to claim 4, characterized in that said tubular member is an exhaust pipe connected to the downstream side of the installation.

7. An installation according to claim 4, characterized in that the insulating layer extends over the connection of the outer housing means with said indent member.

8. An installation according to claim 7, characterized in that the flange is provided at the inlet side of the outer housing means for detachably connecting the outer housing means with a tubular pipe elbow.

9. An installation according to claim 7, characterized in that the flange is provided at the outlet side of the outer housing means for detachably connecting the outer housing means with the tubular member.

10. An installation for the catalytic decontamination of exhaust gases of internal combustion engines comprising an outer housing means, at least one insert housing means disposed therein, said insert housing means including a catalyst-monolith means supported therein by the interposition of radially elastic means, said outer housing means being detachably connected at least at one open side with an adjoining structural part and said insert housing means being insertable into said outer housing means from said side, said insert housing means being axially confined by said adjoining structural part, said installation being further characterized in that said part is a tubular member of an exhaust system, said catalyst-monolith means is essentially cylindrical and in that the insert housing means is an essentially drum-shaped assembly, said assembly comprising two outer collar portions and a wall portion extending therebetween and said assembly fixedly engaging and surrounding the catalyst-monolith means at both outer ends thereof, and in that said elastic means comprises axially and radially elastic annular elements arranged in said collar portions for the support of the catalyst-monolith means and wherein the wall portion of said insert housing means is radially drawn-in between the collar portions and in that said elastic means includes a radially elastic layer disposed between said wall portion and said catalyst-monolith means.

11. An installation for the catalytic decontamination of exhaust gases of internal combustion engines comprising an outer housing means, at least one insert housing means disposed therein, said insert housing means includng and independently supporting a catalyst-monolith means therein by the interposition of radially elastic means, said outer housing means being rigidly connected at its open sides to adjoining structural parts, at least one of said rigid connections being detachable, so that said insert housing means is insertable into said outer housing means from said side, said insert housing means being axially confined by at least one of said adjoining structural parts, said insert housing means having two outer collar portions and a wall portion extending therebetween which is radially drawn-in over at least a portion thereof.

12. An installation according to claim 11, characterized in that the insert housing means consists of two essentially similar halves which are joined at an annular seam located between the two collar portions.

13. An installation according to claim 11, characterized in that one of said parts is a tubular member of an exhaust system.

14. An installation according to claim 13, characterized in that said tubular member is a pipe elbow.

15. An installation according to claim 13, characterized in that said tubular member is an exhaust pipe connected to the upstream side of the installation.

16. An installation according to claim 13, characterized in that the insert housing means is an essentially drum-shaped assembly, said assembly fixedly engaging and surrounding the catalyst-monolith means at the periphery of both outer ends thereof, and in that said elastic means comprises axially and radially elastic annular elements arranged in said collar portions for the support of the catalyst-monolith means.

17. An installation according to claim 11, characterized in that the catalyst-monolith means is essentially cylindrical.

18. An installation according to claim 17, characterized in that the insert housing means is an essentially drum-shaped assembly, said assembly fixedly engaging and surrounding the catalyst-monolith means at both outer ends thereof, and in that said elastic means comprises axially and radially elastic annular elements arranged in said collar portions for the support of the catalyst-monolith means.

19. An installation according to claim 11, characterized in that the outer housing means is tubularly shaped and includes on one side an externally disposed flange and includes on the other side an indent member serving as a support abutment for the insertable insert housing means.

20. An installation according to claim 19, characterized in that the flange is provided at the inlet side of the outer housing means for detachably connecting the outer housing means with a tubular pipe elbow.

21. An installation according to claim 19, characterized in that the flange is provided at the outlet side of the outer housing means for detachably connecting the outer housing means with the tubular member.

22. An installation for the catalytic decontamination of exhaust gases from an internal combustion engine said gases flowing from said engine through a passage in a support structure for said installation, comprising:
an outer housing one end of which is to be rigidly connected to said support structure and an opposite end of which is to be rigidly connected to an exhaust pipe, one of said rigid connections being detachable; and
a plurality of separate insert housings, insertable into said outer housing through the detachable connection end thereof, confined within said outer housing, each insert housing containing and independently supporting
a catalyst-monolith, and
elastic means, annularly surrounding said catalyst-monolith, for resiliently supporting said catalyst-monolith within said insert housing;
said insert housings being disposed within said outer housing in series along the flow path of exhaust gases from said one end to said opposite end of said outer housing, at least one of said support structure and said exhaust pipe serving as an abutment for said insert housings, whereby exhaust gases from said engine flow into said outer housing and are subjected to catalytic decontamination by said catalyst-monoliths as the gases flow therethrough toward said exhaust pipe, said insert housings having two outer collar portions and a wall portion extending therebetween which is radially drawn-in over at least a portion thereof.

23. An installation according to claim 22, wherein each insert housing has outwardly projecting collar portions at respective opposite ends thereof, each collar portion confining elastic material therein which contacts and resiliently supports a respective end portion of a catalyst-monolith.

24. An installation according to claim 23, wherein, in the direction of gas-flow through said installation, the length of each insert housing is greater than the length of the respective catalyst-monolith contained therein.

25. An installation according to claim 24, wherein said elastic means comprises a pair of ring-shaped elastic elements mounted around respective opposite ends of a catalyst-monolith and confined within a respective said collar portion of an insert housing, and an elastic intermediate layer surrounding the catalyst-monolith between the ring-shaped elastic elements.

26. An installation for the catalytic decontamination of exhaust gases of internal combustion engines comprising an outer housing means, at least one insert housing means disposed therein, said insert housing means including a catalyst-monolith means supported therein by the interposition of radially elastic means, said outer housing means being detachably connected at least at one open side with an adjoining structural part and said insert housing means being insertable into said outer housing means from said side, said insert housing means being axially confined by said adjoining structural part, said installation further characterized in that said insert housing means is an assembly comprising two outer collar portions and a wall portion extending therebetween, said insert housing means being radially drawn-in between said collar portions, said assembly fixedly engaging and surrounding the catalyst-monolith means at the periphery of both outer ends thereof and in that said elastic means comprises axially and radially elastic annular elements arranged in said collar portions for the support of the catalyst-monolith means.

* * * * *